United States Patent
Oki et al.

(10) Patent No.: US 8,920,975 B2
(45) Date of Patent: Dec. 30, 2014

(54) METHOD OF PRODUCING NITRIDED LITHIUM-TRANSITION METAL COMPOUND OXIDE, NITRIDED LITHIUM-TRANSITION METAL COMPOUND OXIDE, AND LITHIUM-ION BATTERY

(75) Inventors: Hideki Oki, Susono (JP); Toshihiro Seguchi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 536 days.

(21) Appl. No.: 12/784,796

(22) Filed: May 21, 2010

(65) Prior Publication Data

US 2010/0297504 A1 Nov. 25, 2010

(30) Foreign Application Priority Data

May 21, 2009 (JP) ................................. 2009-123367
Apr. 2, 2010 (JP) ................................. 2010-086231

(51) Int. Cl.
 H01M 4/52 (2010.01)
 H01M 4/58 (2010.01)
 H01M 10/0525 (2010.01)
 H01M 4/02 (2006.01)

(52) U.S. Cl.
 CPC .......... *H01M 10/0525* (2013.01); *Y02E 60/122* (2013.01); *H01M 4/58* (2013.01); *H01M 2004/021* (2013.01)
 USPC ..................................... 429/231.3; 429/231.1

(58) Field of Classification Search
 USPC ........................................... 429/231.1, 231.3
 See application file for complete search history.

(56) References Cited

U.S. PATENT DOCUMENTS

| | | | |
|---|---|---|---|
| 6,953,566 B2 * | 10/2005 | Ramasamy et al. ....... | 423/594.6 |
| 7,740,982 B2 | 6/2010 | Yoshizawa et al. | |
| 2001/0024754 A1 | 9/2001 | Fukuzawa et al. | |
| 2005/0281727 A1 | 12/2005 | Yoshizawa et al. | |
| 2009/0278082 A1 | 11/2009 | Takebayashi et al. | |
| 2009/0305132 A1 | 12/2009 | Gauthier et al. | |
| 2010/0297504 A1 | 11/2010 | Oki et al. | |
| 2013/0022815 A1 | 1/2013 | Oki et al. | |

FOREIGN PATENT DOCUMENTS

| | | |
|---|---|---|
| CN | 1694286 A | 11/2005 |
| CN | 101409346 A | 4/2009 |
| JP | 2001-250549 A | 9/2001 |
| JP | 2002-087824 A | 3/2002 |
| JP | 2002154823 A | 5/2002 |
| JP | 2005-522832 A | 7/2005 |
| JP | 2006032321 A | 2/2006 |
| JP | 2006-286240 A | 10/2006 |
| JP | 2007-257885 A | 10/2007 |
| JP | 2008-542979 A | 11/2008 |
| JP | 2009-110952 A | 5/2009 |
| JP | 2011-001256 A | 1/2011 |
| WO | 03086975 A1 | 10/2003 |

OTHER PUBLICATIONS

Chinese Office Action issued on Sep. 21, 2012 in corresponding Chinese Application No. CN 201010185394.4 and English language translation of the Office Action (16 pages).
Office Action issued to U.S. Appl. No. 13/634,123 (related Application) dated Oct. 8, 2013.
Final Office Action issued to U.S. Appl. No. 13/634,123 (related application) dated May 7, 2014.
Notice of Allowance dated Jul. 31, 2014 from U.S. Appl. No. 13/634,123, filed Oct. 4, 2012.

* cited by examiner

*Primary Examiner* — Stuart Hendrickson
(74) *Attorney, Agent, or Firm* — Gifford, Krass, Sprinkle, Anderson & Citkowski, P.C.

(57) ABSTRACT

Provided is a method of producing a nitrided lithium-transition metal compound oxide having a rock-salt layer structure or a spinel structure, including: preparing a raw material composite that has a raw material containing lithium, transition metal, and oxygen and a nitriding agent that is expressed by a following General Formula (1) and is solid or liquid at room temperature (25° C.); and synthesizing the nitrided lithium-transition metal compound oxide by firing the raw material composite to nitride the raw material.

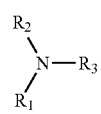

(1)

$R_1$, $R_2$, and $R_3$ are independent of each other and are each a functional group having at least one of carbon (C), hydrogen (H), oxygen (O), and nitrogen (N).

12 Claims, 6 Drawing Sheets

METHOD OF PRODUCING NITRIDED LITHIUM-TRANSITION METAL COMPOUND OXIDE, NITRIDED LITHIUM-TRANSITION METAL COMPOUND OXIDE, AND LITHIUM-ION BATTERY

INCORPORATION BY REFERENCE

The disclosure of Japanese Patent Application No. 2009-123367 filed on May 21, 2009 and Japanese Patent Application No. 2010-086231 filed on Apr. 2, 2010 including the specification, drawings and abstract is incorporated herein by reference in its entirety.

BACKGROUND OF THE INVENTION

1. Field of the Invention

The invention relates to a method of producing a nitrided lithium-transition metal compound oxide useful as a positive electrode active material, for example, the nitrided lithium-transition metal compound oxide, and a lithium-ion battery.

2. Description of the Related Art

The lithium-ion battery has a high electromotive force and a high energy density, and has been widely put into practice in the field of information-related equipment and communication equipment. Meanwhile, in the field of automobiles, the development of electric vehicles and hybrid vehicles is an urgent business in terms of the environmental problem and the resource problem and as the power source for these vehicles, lithium-ion batteries are being studied. The lithium-ion battery typically has a positive electrode active material layer containing a positive electrode active material, a negative electrode active material layer containing a negative electrode active material, and an electrolyte layer formed between the positive electrode active material layer and the negative electrode active material layer.

It has been known that compounds that have a rock-salt layer structure, such as $LiCoO_2$ and compounds that have a spinel structure, such as $LiMn_2O_4$, are used as a positive electrode active material for a lithium-ion battery. Meanwhile, a method of nitriding such a compound (lithium-transition metal compound oxide) with the use of ammonia is available, Japanese Patent Application Publication No. 2006-32321 (JP-A-2006-32321) describes a method of producing an active material, in which, after heating an oxide that has a resistivity of $1 \times 10^4$ Ωcm or more in a reducing atmosphere, the oxide is reacted with ammonia gas to obtain a nitrided oxide that is expressed by a composition formula of $Li_xMeO_yN_z$, where $0 \le x \le 2$, $0.1 < y < 2.2$, $0 < z < 1.4$ and Me is at least one selected from the group consisting of Ti, Co, Ni, Mn, Si, Ge, and Sn. Meanwhile, although not a method of producing a positive electrode active material, a method of nitriding an oxide with the use of urea is available. Japanese Patent Application Publication No. 2002-154823 (JP-A-2002-154823) describes a method of producing an inorganic oxynitride having a photocatalytic activity by heating a mixture of an oxide (titanium oxide, for example) that has a particular specific surface area and a nitrogen compound (urea, for example) that is adsorbed by the oxide at room temperature.

Although nitriding a lithium-transition metal compound oxide with the use of ammonia is already known as described in JP-A-2006-32321, when the ammonia is used, nitriding reaction is hard to occur and therefore, the improvement of the electron conductivity is limited.

SUMMARY OF THE INVENTION

The invention has been made in consideration of the above problem and an object of the invention is to provide a method of producing a nitrided lithium-transition metal compound oxide, by which it is possible to obtain a nitrided lithium-transition metal compound oxide that is excellent in electron conductivity in a simple way, a nitrided lithium-transition metal compound oxide, and a lithium-ion battery.

A first aspect of the invention is a method of producing a nitrided lithium-transition metal compound oxide having a rock-salt layer structure or a spinel structure, including: preparing a raw material composite that has a raw material containing lithium, transition metal, and oxygen and a nitriding agent that is expressed by a following General Formula (1) and is solid or liquid at room temperature (25° C.); and synthesizing the nitrided lithium-transition metal compound oxide by firing the raw material composite to nitride the raw material,

In the General Formula (1), $R_1$, $R_2$, and $R_3$ are independent of each other and are each a functional group having at least one of carbon (C), hydrogen (H), oxygen (O), and nitrogen (N).

According to the first aspect of the invention, the raw material composite containing the nitriding agent that is solid or liquid at room temperature is used and the raw material composite is fired, whereby a nitrided lithium-transition metal compound oxide that is excellent in electron conductivity is obtained in a simple way. Thus, when the nitrided lithium-transition metal compound oxide is used as the positive electrode active material, for example, the amount of electrically conducting material used is relatively reduced and the capacity of battery is increased.

A second aspect of the invention is a nitrided lithium-transition metal compound oxide having a rock-salt layer structure or a spinel structure, wherein the nitrided lithium-transition metal compound oxide is crystalline.

According to the second aspect of the invention, a nitrided lithium-transition metal compound oxide that is excellent in electron conductivity is obtained.

A third aspect of the invention is a nitrided lithium-transition metal compound oxide having a rock-salt layer structure or a spinel structure, wherein nitrogen is present in the inside of the nitrided lithium-transition metal compound oxide.

According to the third aspect of the invention, because the nitrogen is present in the inside of the nitrided lithium-transition metal compound oxide, the nitrided lithium-transition metal compound oxide that is excellent in electron conductivity is obtained.

A fourth aspect of the invention is a lithium-ion battery including: a positive electrode active material layer containing a positive electrode active material; a negative electrode active material layer containing a negative electrode active material; and an electrolyte layer formed between the positive electrode active material layer and the negative electrode active material layer, wherein the positive electrode active material is the above-described nitrided lithium-transition metal compound oxide.

According to the fourth aspect of the invention, the above-described nitrided lithium-transition metal compound oxide is used as the positive electrode active material, so that it is possible to relatively reduce the amount of electrically conducting material used and increase the capacity of the battery.

The invention has an advantage that a nitrided lithium-transition metal compound oxide that is excellent in electron conductivity is obtained in a simple way.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A method of producing a nitrided lithium-transition metal compound oxide, the nitrided lithium-transition metal compound oxide, and a lithium-ion battery of the invention will be described in detail below.

A. Method of Producing Nitrided Lithium-Transition Metal Compound Oxide

First, a method of producing the nitrided lithium-transition metal compound oxide of the invention will be described. The method of producing the nitrided lithium-transition metal compound oxide of the invention is a method of producing a nitrided lithium-transition metal compound oxide that has a rock-salt layer structure or a spinel structure and includes: a preparing step of preparing a raw material composite that contains a raw material containing lithium (Li), transition metal, and oxygen (O) and a nitriding agent that is expressed by the above General Formula (1) and is solid or liquid at room temperature (25° C.); and a synthesizing step of synthesizing a nitrided lithium-transition metal compound oxide by firing the raw material composite to nitride the raw material.

According to the invention, the raw material composite containing the nitriding agent that is solid or liquid at room temperature is used and the raw material composite is fired, so that it is possible to easily obtain a nitrided lithium-transition metal compound oxide that is excellent in electron conductivity. Thus, when a nitrided lithium-transition metal compound oxide is used as a positive electrode active material, for example, the amount of electrically conducting material used is relatively reduced and it is possible to increase the capacity of the battery.

Figure 1:
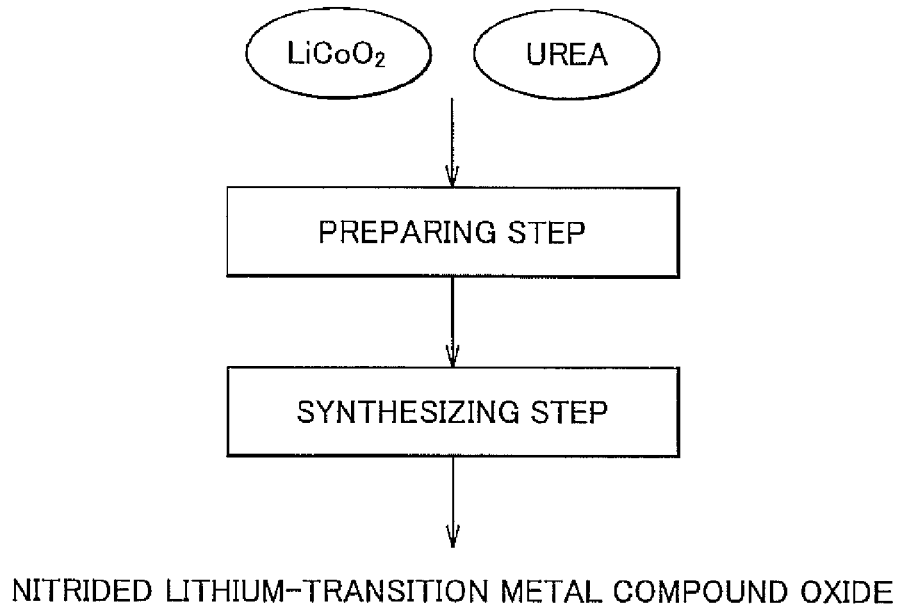
FIG. 1 is an explanatory diagram showing an example of a method of producing the nitrided lithium-transition metal compound oxide of the invention.
Figure 2:
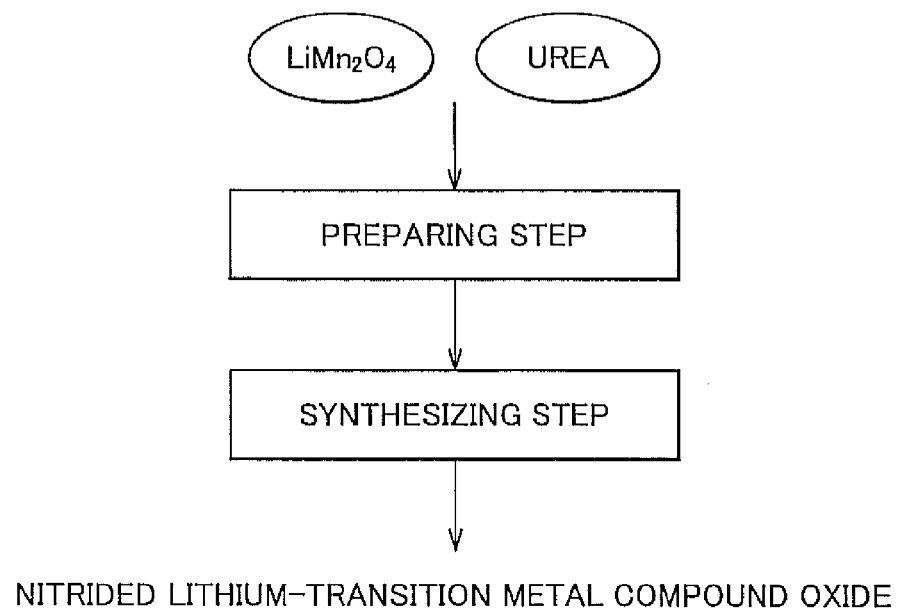
FIG. 2 is an explanatory diagram showing another example of a method of producing the nitrided lithium-transition metal compound oxide of the invention.

FIG. 1 is an explanatory diagram showing an example of a method of producing the nitrided lithium-transition metal compound oxide of the invention. In FIG. 1, lithium cobaltate ($LiCoO_2$, which is a lithium-transition metal compound oxide having a rock-salt layer structure) is prepared as the raw material and urea is prepared as the nitriding agent. Then, these materials are mixed to prepare the raw material composite (preparing step). Then, the obtained raw material composite is fired at 500° C. in a vacuum, for example, to nitride the raw material, whereby the nitrided lithium-transition metal compound oxide is synthesized (synthesizing step). In the invention, as shown in FIG. 2, a lithium manganese oxide ($LiMn_2O_4$), which is a lithium-transition metal compound oxide having a spinel structure may be used as the raw material.

Figure 3A:
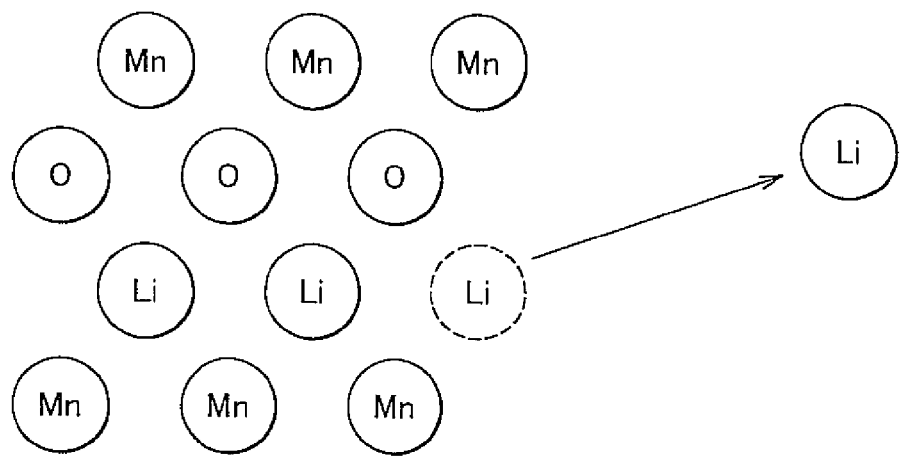
FIGS. 3A and 3B are explanatory diagrams for explaining a mechanism of increasing the capacity.
Figure 3B:
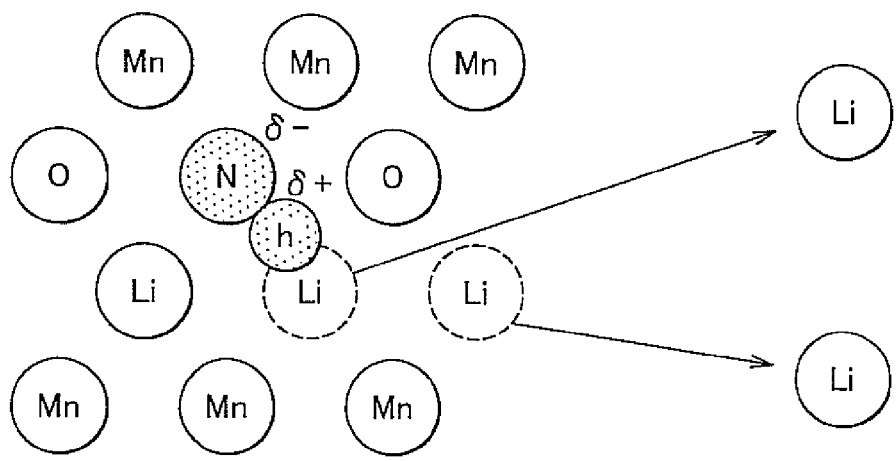

In the invention, by introducing nitrogen, it is possible to obtain a nitrided lithium-transition metal compound oxide having a higher capacity than a non-nitrided lithium-transition metal compound oxide. The reason why the capacity is increased is considered to be as follows. Specifically, it is considered that a nitrided lithium-transition metal compound oxide, in which part of oxygen atoms (O) are replaced by nitrogen atoms (N), is obtained by introducing nitrogen and the nitrogen atoms stabilize the crystal structure of the lithium-transition metal compound oxide. As shown in FIG. 3A, in the case of previously known $LiMn_2O_4$, which is a lithium-transition metal compound oxide having a spinel structure, when Li ions are extracted, the crystal structure of the lithium-transition metal compound oxide is made unstable, and the number of Li ions that can be extracted is limited. In addition, as the battery is used for a long time, manganese is dissolved into the electrolyte solution and the crystal structure is therefore broken, which reduces the number of lithium sites, which can cause reduction in capacity. On the other hand, as shown in FIG. 3B, when part of oxygen atoms of $LiMn_2O_4$ are replaced by nitrogen atoms, an offset of positive electricity (hole h) occurs locally and the hole h compensates for the site from which the Li ion is extracted, which stabilizes the crystal structure. It is considered that by virtue of this mechanism, the number of Li ions that can be extracted is increased and the capacity is increased. It is also considered that by a similar mechanism, the hole h also stabilizes the crystal structure by compensating for the site from which the Mn ion is dissolved out, whereby reduction in capacity due to a long-term use is suppressed. Note that although a nitrided lithium-transition metal compound oxide having a spinel structure is described in connection with FIGS. 3A and 3B, a similar explanation applies to the case of a nitrided lithium-transition metal compound oxide having a rock-salt layer structure, typified by $LiCoO_2$. Each of the steps of a method of producing the nitrided lithium-transition metal compound oxide of the invention will be hereinafter described.

1. Preparing Step

The preparing step of the invention is a step of preparing the raw material composite that contains a raw material containing Li, transition metal, and O, and a nitriding agent that is expressed by the above General Formula (1) and is solid or liquid at room temperature (25° C.).

(1) Raw Material

In the invention, the raw material contains Li, transition metal, and O. The raw material may be the lithium-transition metal compound oxide (raw material compound) having a rock-salt layer structure or a spinel structure or may be a mixture of a plurality of compounds (raw material mixture), from which the lithium-transition metal compound oxide is synthesized. The following description will be given for each of these cases.

(i) When Raw Material is Lithium-Transition Metal Compound Oxide Having Rock-Salt Layer Structure or Spinel Structure In this case, the raw material is not particularly limited as long as the raw material is a compound (lithium-transition metal compound oxide) that contains all of Li, transition metal, and O and has a rock-salt layer structure or a spinel structure. Examples of transition metal include Mn, Co, Ni, V, Cr, and Ti, and among others, Mn, Co, and Ni are preferable. The raw material contains at least one of elements selected from the group consisting of Mg, Al, Si, Cu, Zn, Ga, Ge, Zr, and Nb, other than the above-listed transition metals. The content of these elements is preferably equal to or less than 50 mol % relative to the above transition metals.

Examples of the lithium-transition metal compound oxide having a rock-salt layer structure include a compound that is expressed by the following General Formula (A-1).

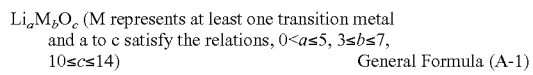

$Li_aM_bO_c$ (M represents at least one transition metal and a to c satisfy the relations, $0<a\le5$, $3\le b\le7$, $10\le c\le14$)      General Formula (A-1)

In General Formula (A-1), b preferably satisfies the relation, $0.8\le b\le1.2$, and more preferably satisfies the relation, $0.9\le b\le1.1$. Meanwhile, c preferably satisfies the relation, $1.4\le c\le2.3$, and more preferably satisfies the relation, $1.6\le c\le2.1$. In addition, M in the General Formula (A-1) is preferably at least one selected from the group consisting of the above-listed transition metals, and more preferably at least one selected from the group consisting of Mn, Co, and Ni. This is because it is possible to obtain a nitrided lithium-transition metal compound oxide that is more excellent in electron conductivity. Specific examples of the lithium-transition metal compound oxide having a rock-salt layer structure include $LiCoO_2$, $LiNiO_2$, $LiMnO_2$, $LiCo_{1/3}Ni_{1/3}Mn_{1/3}O_2$, $LiVO_2$, and $LiCrO_2$.

Examples of the lithium-transition metal compound oxide having a spinel structure include a compound that is expressed by the following General Formula (A-2).

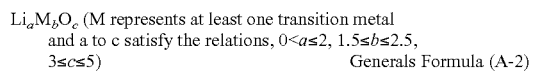

$Li_aM_bO_c$ (M represents at least one transition metal and a to c satisfy the relations, $0<a\le2$, $1.5\le b\le2.5$, $3\le c\le5$)      Generals Formula (A-2)

In General Formula (A-2), b preferably satisfies the relation, $1.7\le b\le2.4$, and more preferably satisfies the relation, $1.9\le b\le2.2$. Meanwhile, c preferably satisfies the relation, $3.2\le c\le4.5$, and more preferably satisfies the relation, $3.5\le c\le4.2$. In addition, M in the General Formula (A-2) is preferably at least one selected from the group consisting of the above-listed transition metals, and more preferably at least one selected from the group consisting of Mn, Co, and Ni. This is because it is possible to obtain a nitrided lithium-transition metal compound oxide that is more excellent in electron conductivity. Specific examples of the lithium-transition metal compound oxide having a spinel structure include $LiMn_2O_4$, $LiCoMnO_4$, $LiNi_{0.5}Mn_{1.5}O_4$, $LiCo_{0.5}Mn_{1.5}O_4$, $LiFe_{0.5}Mn_{1.5}O_4$, and $LiCu_{0.5}Mn_{1.5}O_4$.

Although the lithium-transition metal compound oxide may be particulate (powder) or film, the lithium-transition metal compound oxide is preferably particulate. This is because the particulate lithium-transition metal compound oxide does not suffer the occurrence of a detachment, a crack, etc. unlike a film and is therefore excellent in durability. The average particle size of the particulate lithium-transition metal compound oxide is equal to or larger than 100 nm, for example, and preferably equal to or larger than 2 μm, and more preferably equal to or larger than 4 μm. Meanwhile, the average particle size is equal to or smaller than 100 μm, for example, and preferably equal to or smaller than 20 μm. The average particle size can be determined by a laser diffraction particle size distribution analyzer.

The specific surface area of the lithium-transition metal compound oxide is equal to or larger than 0.1 $m^2/g$, for example, and preferably equal to or larger than 0.5 $m^2/g$. Meanwhile, the specific surface area of the lithium-transition metal compound oxide is equal to or smaller than 300 $m^2/g$, for example, and preferably equal to or smaller than 100 $m^2/g$. The specific surface area can be determined by the Brunauer-Emmett-Teller (BET) method (gas adsorption method).

(ii) When Raw Material is Mixture of Multiple Compounds, from Which Lithium-Transition Metal Compound Oxide Having Rock-Salt Layer Structure or Spinel Structure is Synthesized As described above, the raw material in the invention may be a mixture of a plurality of compounds (raw material mixture), from which the lithium-transition metal compound oxide is synthesized. In this case, there is an advantage that the composition of the target nitrided lithium-transition metal compound oxide is easily adjusted.

Examples of such a raw material mixture include a mixture of the chemical compound containing lithium and the chemical compound containing a transition metal. Examples of the chemical compound containing lithium include $Li_2CO_3$, $Li_2O$, $LiNO_2$, $LiNO_3$, $LiCl$, $CH_3COOLi$, $Li_2C_2O_4$, $LiOH$, $LiH$ and $Li_3P$. The chemical compound containing lithium is preferably a chemical compound, in which the components other than lithium are vaporized by firing. Examples of the compound containing a transition metal include oxalate compounds, carbonate compounds, nitrate compounds, chlorides, sulfate compounds, fluorides, etc. that contain the above-listed transition metal(s).

Because the target nitrided lithium-transition metal compound oxide contains oxygen, it is preferable that at least one of the compound containing lithium and the compound containing transition metal has oxygen. Note that the oxygen may be supplied by the oxygen in the reaction atmosphere. It is preferable that the amount of addition of each of the chemical compounds in the raw material mixture be selected according to the composition of the target nitrided lithium-transition metal compound oxide.

(2) Nitriding Agent

Next, the nitriding agent used in the invention will be described. The nitriding agent used in the invention is expressed by the following General Formula (1) and is solid or liquid at room temperature (25° C.).

General Fromula (1)

In the above General Formula (1), $R_1$, $R_2$, and $R_3$ are independent of each other and are each a functional group having at least one of carbon (C), hydrogen (H), oxygen (O), and nitrogen (N). In the General Formula (1), all of $R_1$, $R_2$, and $R_3$ may be either the same or different from each other.

Alternatively, two of $R_1$, $R_2$, and $R_3$ may be the same and different from the other. It is preferable that at least one of $R_1$, $R_2$, and $R_3$ have carbon (C).

The nitriding agent used in the invention is solid or liquid at room temperature (25° C.). When the nitriding agent is solid or liquid, a raw material composite is prepared, in which the nitriding agent and the raw material are in good physical contact with each other, so that the efficiency in nitriding the raw material composite is improved. Note that when a gas, such as ammonia gas, is used as the nitriding agent, nitriding reaction is hard to occur and the ammonia gas is highly corrosive, which can make the facility cost high.

Examples of the nitriding agent used in the invention include urea, methylamine, ethylamine, diethylamine, triethylamine, aminoethane, aniline, nicotine, and cyclohexylamine. Among others, urea is preferable. This is because urea is less adverse to the composition of the target nitrided lithium-transition metal compound oxide. Note that urea is a chemical compound that is expressed by the General Formula (1), in which $R_1$ and $R_2$ are H and $R_3$ is —$CONH_2$.

It is preferable that the amount of nitriding agent added be selected according to the composition of the target nitrided lithium-transition metal compound oxide. When the proportion of the amount of Li in the raw material is 100 molar parts, it is preferable that the proportion of the amount of nitrogen (N) in the nitriding agent be within a range of 10 molar parts to 100 molar parts, for example, and it is more preferable that the proportion be within a range of 30 molar parts to 60 molar parts. Note that in the invention, it is important that the raw material and the nitriding agent are in sufficient contact with each other before firing. When the proportion of the amount of nitriding agent is too high, the part of the nitriding agent that is not in contact with the raw material is not sufficiently nitrided, which can result in the degradation of the efficiency in nitriding as a whole.

(3) Preparation of Raw Material Composite

The raw material composite used in the invention contains the above-described raw material and the nitriding agent. An example of the method of preparing a raw material composite is a method of mixing a raw material and a nitriding agent. Although the method of mixing the raw material and the nitriding agent is not particularly limited, the more homogeneously the raw material and the nitriding agent are mixed, the more preferable. In particular, in the invention, it is preferable that the raw material and the nitriding agent be mixed by a mechanical milling method (ball milling method, for example). When a mechanical milling method is used, it is possible to perform both pulverization of the raw material and mixing simultaneously and increase the contact area of the raw material ingredients.

The mechanical milling method according to the invention may be either a mechanical milling method that involves a synthesizing reaction or a mechanical milling method that does not involve any synthesizing reaction. The synthesizing reaction herein means a reaction in which a raw material compound is synthesized. Thus, the mechanical milling method that involves a synthesizing reaction can be used when the raw material is a raw material mixture as described above. On the other hand, the mechanical milling method that does not involve any synthesizing reaction can be used when the raw material is a raw material compound (lithium-transition metal compound oxide) as described above. In this way, homogeneity of mixing of the raw material compound and the nitriding agent is improved. When the mixing is performed by a ball milling method, the rotation speed is within a range of 100 rpm to 11000 rpm, for example, and it is preferable that the rotation speed be within a range of 500 rpm to 5000 rpm.

The processing time is not particularly limited and it is preferable that the processing time be set appropriately so as to be able to obtain a desired raw material composite. In the invention, the raw material and the nitriding agent may be merely mixed with the use of a common stirring method.

2. Synthesizing Step

Next, the synthesizing step of the invention will be described. The synthesizing step of the invention is a step of synthesizing a nitrided lithium-transition metal compound oxide by firing the raw material composite to nitride the raw material.

The firing temperature in the invention is not particularly limited as long as it is possible to obtain a desired nitrided lithium-transition metal compound oxide. It is preferable that the firing temperature be equal to or higher than the temperature, at or above which the nitriding agent is decomposed or melted. This is because it becomes easy to obtain a nitrided lithium-transition metal compound oxide in which nitrogen is chemically bonded. The Bring temperature is preferably selected according to the kind of nitriding agent used. The firing temperature is equal to or higher than 100° C., for example, and preferably equal to or higher than 200° C., and more preferably equal to or higher than 300° C. When the firing temperature is too low, there is a fear that nitriding reaction does not sufficiently progress and the nitrided lithium-transition metal compound oxide cannot be obtained. Meanwhile, the firing temperature is equal to or lower than 800° C., for example. The firing temperature is preferably equal to or lower than 700° C., and more preferably equal to or lower than 500° C., and still more preferably equal to or lower than 450° C. When the firing temperature is too high, there is a fear that nitrogen is eliminated from the nitrided lithium-transition metal compound oxide. The firing time is equal to or longer than 10 minutes, for example, and preferably equal to or longer than 30 minutes. Meanwhile, the firing time is equal to or shorter than 7 hours, for example, and preferably equal to or shorter than 5 hours.

The atmosphere during firing is not particularly limited. Examples of the atmosphere include: an air atmosphere; an inert gas atmosphere, such as a nitrogen atmosphere or an argon atmosphere; a reducing atmosphere, such as an ammonia atmosphere or a hydrogen atmosphere; and vacuum. Among others, the inert gas atmosphere, the reducing atmosphere, and the vacuum are preferable and in particular, the reducing atmosphere is preferable. This is because it is possible to prevent the nitrided lithium-transition metal compound oxide from being degraded due to oxidation. Examples of the method of firing the raw material composite include a method using a firing furnace. In the invention, it is preferable that after a nitrided lithium-transition metal compound oxide is synthesized, firing for removing the remaining urea be performed.

3. Other

The nitrided lithium-transition metal compound oxide obtained in the invention is useful for an electrode active material, for example, and it is particularly preferable that the nitrided lithium-transition metal compound oxide be used as a positive electrode active material. This is because the nitrided lithium-transition metal compound oxide is excellent in electron conductivity and therefore, it is possible to relatively reduce the amount of electrically conducting material used and increase the capacity of the battery. Thus, the invention provides a method of manufacturing lithium-ion batteries, which is characterized by including a step of performing the preparing step and the synthesizing step to obtain a positive electrode active material and a step of forming a positive electrode active material layer with the use of the positive electrode active material. The invention also provides a positive electrode active material characterized by being obtained by the above producing method.

B. Nitrided Lithium-Transition Metal Compound Oxide

Next, a nitrided lithium-transition metal compound oxide of the invention will be described. The nitrided lithium-transition metal compound oxide of the invention is obtained by the method described in the above section "A. Method of Producing Nitrided Lithium-Transition Metal Compound Oxide," for example. It is preferable that the nitrided lithium-transition metal compound oxide of the invention be such that part of oxygen atoms (O) are replaced by nitrogen atoms (N). The nitrided lithium-transition metal compound oxides of the invention are broadly classified into following first and second embodiments. Each of the embodiments will be described below.

First Embodiment

A first embodiment of the nitrided lithium-transition metal compound oxide of the invention is a nitrided lithium-transition metal compound oxide that has a rock-salt layer structure or a spinel structure and is characterized by being crystalline. The fact that the nitrided lithium-transition metal compound oxide is crystalline can be confirmed by X-ray diffraction (XRD).

The first embodiment provides a nitrided lithium-transition metal compound oxide that is excellent in electron conductivity. In addition, because the nitrided lithium-transition metal compound oxide is crystalline, there are advantages that reversibility in insertion and extraction of Li ions is higher and that the battery voltage is more highly stable, as compared to the case where the nitrided lithium-transition metal compound oxide is amorphous. The above-cited JP-A-2006-32321 describes that the active material is amorphous (claim 2 and FIG. 3 thereof, for example). However, there is no description that the active material is crystalline. Even when the lithium-transition metal compound oxide ($LiCoO_2$ or $LiMn_2O_4$, for example) is nitrided under conditions described in JP-A-2006-32321 (conditions, in which ammonia is used), the nitrided lithium-transition metal compound oxide that is crystalline cannot be obtained.

The composition of the nitrided lithium-transition metal compound oxide of the first embodiment is not particularly limited. However, it is preferable that the composition be similar to the composition of the nitrided lithium-transition metal compound oxide obtained by "A. Method of Producing Nitrided Lithium-Transition Metal Compound Oxide" described above, for example. Examples of the nitrided lithium-transition metal compound oxide include a compound that has a rock-salt layer structure and that is expressed by $Li_aM_bO_cN_d$ (M represents at least one transition metal and a to d satisfy the relations, $0<a\leq1.3$, $0.7\leq b\leq1.3$, $1.5\leq c\leq2.5$, and $0.01\leq d\leq0.6$) This general formula is referred to as the General Formula (B-1) in some cases. In the General Formula (B-1), b preferably satisfies the relation, $0.8\leq b\leq1.2$, and more preferably satisfies the relation, $0.9\leq b\leq1.1$, c preferably satisfies the relation, $1.4\leq c\leq2.3$, and more preferably satisfies the relation, $1.6\leq c\leq2.1$, d preferably satisfies the relation, $0.05\leq d\leq0.5$, and more preferably satisfies the relation, $0.1\leq d\leq0.4$. In addition, M in the General Formula (B-1) is preferably at least one selected from the group consisting of the transition metals listed in the above section, "A. Method of Producing Nitrified Lithium-Transition Metal Compound Oxide," and more preferably at least one selected from the group consisting of Mn, Co, and Ni. This is because it is possible to obtain a nitrided lithium-transition metal compound oxide that is more excellent in electron conductivity.

Meanwhile, other examples of the nitrided lithium-transition metal compound oxide include a compound that has a spinel structure and that is expressed by $Li_aM_bO_cN_d$ (M represents at least one selected from the group consisting of Mn, Co, and Ni, and a to d satisfy the relations, $0<a\leq2.0$, $1.5\leq b\leq2.5$, $3\leq c\leq5$, and $0.01\leq d\leq0.6$) This general formula is referred to as the General Formula (B-2) in some cases. In the General Formula (B-2), b preferably satisfies the relation, $1.7\leq b\leq2.4$, and more preferably satisfies the relation, $1.9\leq b\leq2.2$, c preferably satisfies the relation, $3.2\leq c\leq4.5$, and more preferably satisfies the relation, $3.5\leq c\leq4.2$, d preferably satisfies the relation, $0.05\leq d\leq50.5$, and more preferably satisfies the relation, $0.1\leq d\leq0.4$. In addition, M in the General Formula (B-2) is preferably at least one selected from the group consisting of the transition metals listed in the above section, "A. Method of Producing Nitrided Lithium-Transition Metal Compound Oxide," and more preferably at least one selected from the group consisting of Mn, Co, and Ni. This is because it is possible to obtain a nitrided lithium-transition metal compound oxide that is more excellent in electron conductivity.

The nitrided lithium-transition metal compound oxide of the first embodiment may further have at least one of the features of second and third embodiments described below. Details will be described in the description of each of the embodiments.

The nitrided lithium-transition metal compound oxide of the first embodiment may be either particulate (powder) or film. However, the lithium-transition metal compound oxide is preferably particulate. This is because the particulate lithium-transition metal compound oxide does not suffer the occurrence of a detachment, a crack etc. unlike a film and is therefore excellent in durability. The average particle size of the particulate, nitrided lithium-transition metal compound oxide is equal to or larger than 100 nm, for example, and preferably equal to or larger than 2 μm, and more preferably equal to or larger than 4 μm. Meanwhile, the average particle size is equal to or smaller than 100 μm, for example, and preferably equal to or smaller than 20 μm. The average particle size can be determined by a laser diffraction particle size distribution analyzer.

The specific surface area of the nitrided lithium-transition metal compound oxide of the first embodiment is equal to or larger than 0.1 $m^2/g$, for example, and preferably equal to or larger than 0.5 $m^2/g$. Meanwhile, the specific surface area of the nitrided lithium-transition metal compound oxide is equal to or smaller than 300 $m^2/g$, for example, and preferably equal to or smaller than 100 $m^2/g$. The specific surface area can be determined by the Brunauer-Emmett-Teller (BET) method (gas adsorption method). When a film that is formed by sputtering or vapor deposition commonly used is scraped, there is a possibility that a particulate nitrided lithium-transition metal compound oxide similar to the nitrided lithium-transition metal compound oxide described above is obtained. However, such particles are formed from a film that has little unevenness and therefore, the specific surface area of such particles is small. On the other hand, the nitrided lithium-transition metal compound oxide obtained by the method described in the above section, "A. Method of Producing Nitrided Lithium-transition metal Compound Oxide," has unevenness in the surface of the particles and therefore, the specific surface area thereof is large.

It is preferable that the nitrided lithium-transition metal compound oxide of the first embodiment be such that nitrogen atom(s) (N) are not merely adsorbed by the lithium-transition metal compound oxide but incorporated into the composition of the nitrided lithium-transition metal compound oxide. In the first embodiment, it is preferable that the nitrided lithium-transition metal compound oxide be such that part of oxygen atoms (O) are replaced by nitrogen atoms (N) as described above.

The nitrided lithium-transition metal compound oxide of the first embodiment is useful as an electrode active material, for example, and it is preferable that the nitrided lithium-transition metal compound oxide be used as a positive electrode active material, This is because the nitrided lithium-transition metal compound oxide has a high electron conductivity and therefore, it is possible to relatively reduce the amount of electrically conducting material used and increase the capacity of the battery. It is preferable that the nitrided lithium-transition metal compound oxide of the first embodiment be one that is obtained by the method described in the above section, "A. Method of Producing Nitrided lithium-transition metal Compound Oxide."

Second Embodiment

Next, a second embodiment of the nitrided lithium-transition metal compound oxide of the invention will be described. The nitrided lithium-transition metal compound oxide of the second embodiment is a nitrided lithium-transition metal compound oxide that has Li, Ti, O, and N and is characterized in that nitrogen is present in the inside of the nitrided lithium-transition metal compound oxide. The presence of nitrogen in the inside of a nitrided lithium-transition metal compound oxide can be confirmed based on the N1s peak (the peak occurring between 395 eV and 398 eV) of the XPS measurement.

According to the second embodiment, nitrogen is present in the inside of the nitrided lithium-transition metal compound oxide, so that it is possible to obtain a nitrided lithium-transition metal compound oxide that is excellent in electron conductivity. In JP-A-2006-32321 cited above, there is no description that nitrogen is present in the inside of the nitrided lithium-transition metal compound oxide. Even when the lithium-transition metal compound oxide ($LiCoO_2$ or $LiMn_2O_4$, for example) is nitrided under conditions described in JP-A-2006-32321 (conditions, in which ammonia is used), only the surface of the lithium-transition metal compound oxide is nitrided and nitrogen is not present in the inside of the nitrided lithium-transition metal compound oxide.

The "inside" in the invention means the position at 20 nm or deeper from the surface of the nitrided lithium-transition metal compound oxide.

The composition of the nitrided lithium-transition metal compound oxide of the second embodiment is not particularly limited. However, it is preferable that the composition is similar to that of the nitrided Lithium-transition metal compound oxide that is obtained by "A. Method of Producing Nitrided lithium-transition metal Compound Oxide" described above. The preferable composition is similar to those in the case of the first embodiment. The nitrided lithium-transition metal compound oxide of the second embodiment may be either amorphous or crystalline. The shape, physical properties, etc. of the nitrided lithium-transition metal compound oxide are similar to those of the first embodiment described above and the description thereof is therefore omitted.

C. Lithium-Ion Battery

Next, a lithium-ion battery of the invention will be described. The lithium-ion battery of the invention is a lithium-ion battery that has a positive electrode active material layer containing a positive electrode active material; a negative electrode active material layer containing a negative electrode active material; and an electrolyte layer formed between the positive electrode active material layer and the negative electrode active material layer, the lithium-ion battery being characterized in that the positive electrode active material is a nitrided lithium-transition metal compound oxide described above.

According to the invention, by using a nitrided lithium-transition metal compound oxide that is excellent in electron conductivity as the positive electrode active material, the amount of electrically conducting material used is relatively reduced and the capacity of the battery is increased. In addition, when a nitrided lithium-transition metal compound oxide described above is used, it is possible to improve the Li ion conductivity.

Figure 4:
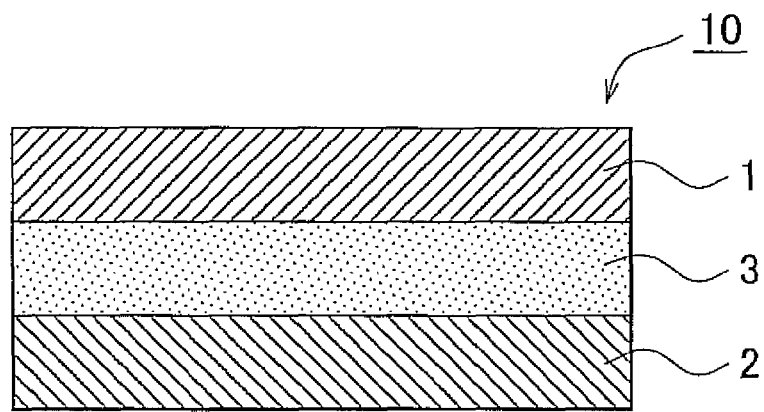
FIG. 4 is a schematic sectional diagram showing an example of an electricity generating element of a lithium-ion battery of the invention.

FIG. 4 is a schematic sectional diagram showing an example of an electricity generating element of a lithium-ion battery of the invention. The electricity generating element 10 shown in FIG. 4 includes: a positive electrode active material layer 1 containing a positive electrode active material; a negative electrode active material layer 2 containing a negative electrode active material; and an electrolyte layer 3 formed between the positive electrode active material layer 1 and the negative electrode active material layer 2. In addition, the invention is largely characterized in that a nitrided lithium-transition metal compound oxide described above is used as the negative electrode active material contained in the positive electrode active material layer 1. The electrolyte layer 3 may be any one of a liquid electrolyte layer, a gel electrolyte layer, and a solid electrolyte layer, as described later. Each of the constituent elements of the lithium-ion battery of the invention will be described below.

1. Positive Electrode Active Material Layer

First, the positive electrode active material of the invention will be described. The positive electrode active material of the invention is a layer containing, as a positive electrode active material, at least a nitrided lithium-transition metal compound oxide described above. The positive electrode active material layer may contain at least one of an electrically conducting material, a binder, and a solid electrolyte material, as needed. In particular, when the lithium-ion battery of the invention has a liquid electrolyte layer, it is preferable that the positive electrode active material layer further contain a binder. This is because falling off of the positive electrode active material is effectively suppressed. In addition, when the lithium-ion battery of the invention has a solid electrolyte layer, it is preferable that the positive electrode active material layer further contain a solid electrolyte material. This is because it is possible to improve the Li ion conductivity in the positive electrode active material layer.

Description of the nitrided lithium-transition metal compound oxide used as the positive electrode active material is similar to that given in the above section "B. Nitrided Lithium-Transition Metal Compound Oxide," and the description thereof is omitted. The electrically conducting material is not particularly limited as long as it has a desired electrical conductivity and examples thereof include an electrically conducting material made of a carbon material. Specifically, such examples include acetylene black, carbon black, coke, carbon fibers, and graphite. It is more preferable that the electrically conducting material be carbon fibers, the average diameter of which is equal to or smaller than 1 μm, graphite, and coke, the heat treatment temperature of which is 800° C. to 2000° C. and the average particle size of which is equal to or smaller than 10 μm. The BET specific surface area of the electrically conducting material measured by causing $N_2$ to be adsorbed is preferably equal to or larger than $10\,m^2/g$.

It is preferable that the binder be chemically and electrically stable and specifically, examples of the binder include a fluorine-based binder, such as polyvinylidene fluoride (PVDF) or polytetrafluoroethylene (PTFE), and a rubber binder, such as styrene-butadiene rubber. The solid electrolyte layer is formed with the use of a solid electrolyte material. Examples of the solid electrolyte material include oxide-based solid electrolyte material and sulfide-based solid electrolyte material, and the sulfide-based solid electrolyte material is particularly preferable. This is because the Li ion conductivity is high and it is possible to obtain a high-power battery. The solid electrolyte material will be described in detail in the section, "3. Electrolyte Layer," below.

In terms of the capacity, the more the amount of positive electrode active material contained in the positive electrode active material layer is, the more preferable. The amount of positive electrode active material is within a range of 60 percent by weight to 99 percent by weight, for example, and preferably within a range of 70 percent by weight to 95 percent by weight. The less the amount of electrically conducting material contained is, the more preferable, as long as a desired electron conductivity is obtained. The amount of electrically conducting material is preferably within a range of 1 percent by weight to 30 percent by weight, for example. The less the amount of binder contained is, the more preferable, as long as it is possible to stably fix the positive electrode active material etc. The amount of binder is preferably within a range of 1 percent by weight to 30 percent by weight, for example. The less the amount of solid electrolyte material contained is, the more preferable, as long as it is possible to secure a desired electron conductivity. The amount of solid electrolyte material is preferably within a range of 1 percent by weight to 40 percent by weight, for example.

The thickness of the positive electrode active material layer significantly varies depending on the configuration of a lithium-ion battery, and is preferably within a range of 0.1 μm to 1000 μm, for example.

2. Negative Electrode Active Material Layer

Next, the negative electrode active material layer of the invention will be described. The negative electrode active material layer of the invention is a layer containing at least the negative electrode active material and may contain at least one of an electrically conducting material, a binder, and a solid electrolyte material, as needed.

Examples of the negative electrode active material include a metal active material and a carbon active material. Examples of the metal active material include In, Al, Si, and Sn. Meanwhile, examples of the carbon active material include mesocarbon microbeads (MCMB), highly oriented pyrolytic graphite (HOPG), hard carbon, and soft carbon. With regard to the shape of the negative electrode active material, it may be either film or particulate, for example. In the former case, typically, the negative electrode active material itself is the negative electrode active material layer. The average particle size of the particulate negative electrode active material is within a range of 1 nm to 100 μm, for example, and preferably within a range of 10 nm to 30 μm. The specific surface area of the particulate negative electrode active material is preferably within a range of 0.1 m$^2$/g to 10 m$^2$/g, for example. The electrically conducting material, the binder, and the solid electrolyte material that are used for the negative electrode active material layer are similar to those used for the negative electrode active material layer described above and the description thereof is omitted.

When the negative electrode active material is particulate, the negative electrode active material layer may contain at least one of an electrically conducting material, a binder, and a solid electrolyte material, as needed, in addition to the particulate negative electrode active material. In terms of the capacity, the more the amount of negative electrode active material contained in the negative electrode active material layer is, the more preferable. The amount of negative electrode active material is within a range of 60 percent by weight to 99 percent by weight, for example, and preferably within a range of 70 percent by weight to 95 percent by weight. The less the amount of electrically conducting material contained is, the more preferable, as long as a desired electron conductivity is obtained. The amount of electrically conducting material is preferably within a range of 1 percent by weight to 30 percent by weight, for example. The less the amount of binder contained is, the more preferable, as long as it is possible to stably fix the negative electrode active material etc. The amount of binder is preferably within a range of 1 percent by weight to 30 percent by weight, for example. The less the amount of solid electrolyte material contained is, the more preferable, as long as it is possible to secure a desired electron conductivity. The amount of solid electrolyte material is preferably within a range of 1 percent by weight to 40 percent by weight, for example.

The thickness of the negative electrode active material layer significantly varies depending on the configuration of a lithium-ion battery, and is preferably within a range of 0.1 μm to 1000 μm, for example.

3. Electrolyte Layer

Next, the electrolyte layer of the invention will be described. The electrolyte layer of the invention is a layer formed between the positive electrode active material layer and the negative electrode active material layer. The Li ion conduction between the positive electrode active material and the negative electrode active material is performed through the electrolyte contained in the electrolyte layer. The form of the electrolyte layer is not particularly limited. Examples of the form of the electrolyte layer include a liquid electrolyte layer, a gel electrolyte layer, and a solid electrolyte layer The liquid electrolyte layer is typically a layer formed with the use of a nonaqueous electrolyte solution. The nonaqueous electrolyte solution of a lithium-ion battery typically contains a lithium salt and a nonaqueous solvent. Examples of the lithium salt include inorganic lithium salts, such as $LiPF_6$, $LiBF_4$, $LiClO_4$, or $LiAsF_6$, and an organic lithium salts, such as $LiCF_3SO_3$, $LiN(CF_3SO_2)_2$, $LiN(C_2F_5SO_2)_2$, or $LiC(CF_3SO_2)_3$. Examples of the nonaqueous solvent include ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxyethane, 1,3-dimethoxypropane, diethyl ether, tetrahydrofuran, 2-methyltetrahydrofuran, and a mixture of these compounds. The concentration of the lithium salt in the nonaqueous electrolyte solution is within a range of 0.5 mol/L to 3 mol/L, for example. In the invention, a low-volatile liquid, such as an ionic liquid, may be used as the nonaqueous electrolyte solution.

The gel electrolyte layer can be obtained by adding a polymer to the nonaqueous electrolyte solution for gelation, for example. Specifically, gelation can be performed by adding a polymer, such as polyethylene oxide (PEO), polyacrylonitrile (PAN), or polymethylmethacrylate (PMMA) to the above nonaqueous electrolyte solution.

The solid electrolyte layer is formed with the use of a solid electrolyte material. Examples of the solid electrolyte material include oxide-based solid electrolyte material and sulfide-based solid electrolyte material, and the sulfide-based solid electrolyte material is particularly preferable. This is because the Li ion conductivity is high and it is possible to obtain a high-power battery. The sulfide-based solid electrolyte material is not particularly limited as long as the sulfide-based solid electrolyte material contains Li and S and has Li ion conductivity. Examples of the sulfide-based solid electrolyte material include one that contains Li, S and a third component A. The third component A may be at least one selected from the group consisting of P, Ge, B, Si, I, Al, Ga, and As. In particular, in the invention, it is preferable that the sulfide-based solid electrolyte material be a compound obtained with the use of $Li_2S$ and a sulfide (MS) other than $Li_2S$. Specifically, examples of the sulfide-based solid electrolyte material include $Li_2S$—$P_2S_5$ compound, $Li_2S$—$SiS_2$ compound, and $Li_2S$—$GeS_2$ compound. Among others, $Li_2S$—$P_2S_5$ compound is preferable. This is because the Li ion conductivity is high. When it is assumed that the molar ratio between $Li_2S$ and the sulfide (MS) satisfies $xLi_2S$-$(100-x)MS$, it is preferable that x satisfy the relation, $50 \leq x \leq 95$, and it is more preferable that x satisfy the relation, $60 \leq x \leq 85$. The $Li_2S$—$P_2S_5$ compound means a sulfide-based solid electrolyte material obtained with the use of $Li_2S$ and $P_2S_5$. The same applies to the other compounds. For example, by performing a mechanical milling method or a melt-quenching method using $Li_2S$ and $P_2S_5$, an amorphous $Li_2S$—$P_2S_5$ compound is obtained.

The sulfide-based solid electrolyte material may be either amorphous or crystalline. A crystalline, sulfide-based solid electrolyte material is obtained by firing an amorphous sulfide-based solid electrolyte material, for example. It is preferable that the sulfide-based solid electrolyte material have bridging sulfur atoms. This is because the Li ion conductivity of such a sulfide-based solid electrolyte material is high. In particular, in the invention, it is preferable that the sulfide-based solid electrolyte material be $Li_7P_3S_{11}$. This is because the Li ion conductivity is high. The average particle size of the solid electrolyte material is within a range of 1 nm to 100 μm, for example, and preferably within a range of 10 nm to 30 μm.

The thickness of the electrolyte layer significantly varies depending on the configuration of a lithium-ion battery. The thickness is within a range of 0.1 μm to 1000 μm, for example, and preferably within a range of 01 μm to 300 μm.

4. Other Elements

The lithium-ion battery of the invention has at least the negative electrode active material layer, the electrolyte layer, and the positive electrode active material layer. Typically, the lithium-ion battery has a positive electrode current collector for collecting electric currents flowing through the positive electrode active material layers and a negative electrode current collector for collecting electric currents flowing through the negative electrode active material layers. Examples of the material for the positive electrode current collector include SUS, aluminum, nickel, iron, titanium, and carbon. Among others, SUS is preferable. Examples of the material for the negative electrode current collector include SUS, copper, nickel, and carbon. Among others, SUS is preferable. It is preferable that the thickness, shape, etc. of the positive electrode current collector and the negative electrode current collector be selected according to the application etc. of the lithium-ion battery.

The lithium-ion battery of the invention may have a separator between the positive electrode active material layer and the negative electrode active material layer. This is because a safer lithium-ion battery is obtained. Examples of the material for the separator include porous films made of polyethylene, polypropylene, cellulose, polyvinylidene fluoride, or the like, and nonwoven fabric, such as resin nonwoven fabric or glass-fiber nonwoven fabric. A commonly used battery case for a lithium-ion battery can be used as the battery case used in the invention. Examples of the battery case include a battery case made of SUS. When the lithium-ion battery of the invention is an all-solid-state battery, electricity generating elements may be formed inside the insulation ring.

The invention is not limited to the above embodiments. The above embodiments are merely examples and those substantially the same as the technical idea recited in the claims and bringing about similar operations and effects are all within the scope of the invention.

Examples will be given below and the invention will be more specifically described.

EXAMPLE 1

First, $LiCoO_2$ (made by Sigma-Aldrich Co.), of which the average particle size was 2.5 μm, was prepared as a raw material compound, and urea (made by Sigma-Aldrich Co.) was prepared as the nitriding agent. Next, 1 g of $LiCoO_2$ and 1 g of urea were measured ($LiCoO_2$:urea=10:8.6 in molar ratio) and mixed in a mortar to obtain a raw material composite. Then, the obtained raw material composite was formed into a mold with the dimensions, φ1 cm×2 mm thick, in a molding machine, and the obtained mold was put in a glass tube and the inside of the glass tube was made vacuum. Next, the glass tube was fired at 500° C. in a tubular furnace for three hours. Thus, the nitrided lithium-transition metal compound oxide was synthesized. Then, the mold was fired in the air atmosphere at 500° C. for an hour to remove the remaining urea, whereby a nitrified lithium-transition metal compound oxide was obtained. The specific surface area of the obtained nitrided lithium-transition metal compound oxide was measured by the BET method. In the measurement, a full-automatic gas adsorption measuring apparatus (Autosorb®-1 made by Yuasa Ionics Inc.) for measuring specific surface area and pore distribution was used. As a result, the specific surface area of the nitrided lithium-transition metal compound oxide was 1 $m^2/g$.

COMPARATIVE EXAMPLE 1

The $LiCoO_2$ used in Example 1 was used as a reference compound.

EXAMPLE 2

$LiMn_2O_4$ (made by Sigma-Aldrich Co.), of which the average particle size was 5 μm, was prepared as a raw material compound, and urea (made by Sigma-Aldrich Co.) was prepared as the nitriding agent. Next, 1 g of $LiMn_2O_4$ and 1 g of urea were measured ($LiMn_2O_4$:urea=10:15.6 in molar ratio) and mixed in a mortar to obtain a raw material composite. A nitrided lithium-transition metal compound oxide was obtained in a manner similar to Example 1, except that this raw material composite was used. The specific surface area of the obtained nitrided lithium-transition metal compound oxide was 0.6 $m^2/g$.

COMPARATIVE EXAMPLE 2

The $LiMn_2O_4$ used in Example 2 was used as a reference compound.

(Evaluation 1)
Measurement of Oxidation-Reduction Potential by Cyclic Voltammetry (CV)

The nitrided lithium-transition metal compound oxide obtained in Examples 1 and 2 and the reference compound obtained in Comparative Examples 1 and 2 were used to measure the oxidation-reduction potential. First, button batteries to be evaluated were made. Positive electrode active material layers were formed (weight: 10 mg), each having the nitrided lithium-transition metal compound oxide or the reference compound, which is a positive electrode active material, polytetrafluoroethylene (PTFE), which is a binder, and Ketjen Black (KB), which is an electrically conducting material, at a ratio of (positive electrode active material):(binder):(electrically conducting material)=70:5:25 (weight ratio). Next, Li was used as a negative electrode active material layer and a solution, in which $LiPF_6$ was dissolved at a concentration of 1 M in a nonaqueous solvent obtained by mixing ethylene carbonate (EC) and dimethyl carbonate (DEC) at a volume ratio of 1:1, was used as the nonaqueous solution, to obtain button batteries to be evaluated.

The obtained button batteries to be evaluated were subjected to cyclic voltammetry (CV) with the use of an electrochemical measurement system (Model 147055BEC made by Solartron Analytical), whereby the oxidation-reduction potential was measured. The measurement conditions were that the potential range was 2.0 V to 4.2 V (vs $Li/Li^+$) and that the sweep speed was 0.1 mV/sec. The obtained results of the oxidation-reduction potential are shown in Table 1.

TABLE 1

|  | Reduction | | Oxidation Potential (V) | |
| --- | --- | --- | --- | --- |
|  | Potential (V) | Current (mA) | Potential (V) | Current (mA) |
| Example 1 | 3.96 | 2.19 | 3.85 | 1.84 |
| Comparative Example 1 | 3.95 | 0.85 | 3.83 | 1.45 |
| Example 2 | 4.17 | 1.89 | 3.82 | 1.79 |
| Comparative Example 2 | 4.15 | 0.55 | 3.85 | 0.66 |

As shown in Table 1, it has been confirmed that in the case of Example 1, the oxidation-reduction potential does not change and the current value significantly increases as compared to those of Comparative Example 1. Similarly, in the case of Example 2, the oxidation-reduction potential does not change and the current value significantly increases as compared to those of Comparative Example 2. It is considered that this is because the electron conductivity of the obtained nitrided lithium-transition metal compound oxide is improved. Note that the current value significantly affects the output from the battery. The larger the current value is, the more the output characteristics of the battery are improved. Thus, it has been confirmed that the output characteristics of the battery is improved by using the nitrided lithium-transition metal compound oxide of the invention.

In general, the difference between the oxidation potential of the positive electrode active material and the reduction potential of the negative electrode active material becomes the battery voltage. The oxidation potential was at the same level between Example 1 and Comparative Example 1 and therefore, the battery voltage is not reduced by introducing nitrogen. On the other hand, the difference between the reduction potential of the positive electrode active material and the oxidation potential of the negative electrode active material is the voltage for charging the battery. Thus, it has also been confirmed that the charging voltage is not reduced by introducing nitrogen.

The total amount of reduction current and the total amount of oxidation current were calculated with the use of the button battery to be evaluated. Specifically, the total amount of reduction current and the total amount of oxidation current were calculated by integrating the CV curve obtained by the CV. In addition, the rate of change of the total amount of reduction current and the total amount of oxidation current after charging and discharging was studied. The result is shown in Table 2.

TABLE 2

|  | Total Amount of Reduction Current | | Total Amount of Oxidation Current | |
| --- | --- | --- | --- | --- |
|  | Fifth Cycle | Tenth Cycle | Fifth Cycle | Tenth Cycle |
| Example 1 | 0.99 | 0.96 | 0.99 | 0.98 |
| Comparative Example 1 | 0.98 | 0.96 | 0.99 | 0.95 |
| Example 2 | 0.91 | 0.82 | 0.93 | 0.85 |
| Comparative Example 2 | 0.81 | 0.69 | 0.86 | 0.74 |

* The rate of change when the value for the first cycle is assumed to be 1.00

As shown in Table 2, the total amount of reduction current and the total amount of oxidation current are larger in Example 1 as compared to the case of Comparative Example 1. Similarly, the total amount of reduction current and the total amount of oxidation current are larger in Example 2 as compared to the case of Comparative Example 2. From these results, it has been confirmed that the cycle degradation is reduced by introducing nitrogen. The active material having a spinel structure, such as $LiMn_2O_4$ used in Comparative Example 2, tends to suffer significant cycle degradation. By contrast, in the case of Example 2, the cycle degradation was reduced. It is considered that this is because the introduction of nitrogen makes the transition metal (Mn, for example) difficult to be dissolved into the electrolyte solution.

EXAMPLE 3

$LiCoO_2$ (made by Sigma-Aldrich Co.), of which the average particle size was 2.5 μm, was prepared as a raw material compound, and urea (made by Sigma-Aldrich Co.) was prepared as the nitriding agent. Next, 1 g of $LiCoO_2$ and 1 g of urea were measured ($LiCoO_2$:urea=10:8.6 in molar ratio) and mixed in a mortar for 15 minutes to obtain a raw material composite. Then, the obtained raw material composite was formed into a mold with the dimensions, φ1 cm×2 mm thick, in a molding machine, and the obtained mold was broken to some extent and put in a glass tube and the inside of the glass tube was made vacuum. Next, the glass tube was fired at 500° C. in a tubular furnace for six hours. In this way, the nitrided lithium-transition metal compound oxide was synthesized. Then, the obtained nitrided lithium-transition metal compound oxide was transferred into a melting pot and fired in the air atmosphere at 750° C. for five hours to remove the remaining urea, whereby a nitrided lithium-transition metal compound oxide was obtained.

COMPARATIVE EXAMPLE 3

The $LiCoO_2$ used in Example 3 was used as a reference compound.

EXAMPLE 4

$LiNi_{0.5}Mn_{1.5}O_4$ (made by Sigma-Aldrich Co.), of which the average particle size was 5 μm, was prepared as a raw material compound, and urea (made by Sigma-Aldrich Co.) was prepared as the nitriding agent. Next, 1 g of $LiNi_{0.5}Mn_{1.5}O_4$ and 1 g of urea were measured ($LiNi_{0.5}Mn_{1.5}O_4$:urea=1:2.5 in molar ratio) and mixed in a mortar for 15 minutes to obtain a raw material composite. A nitrided lithium-transition metal compound oxide was obtained in a manner similar to Example 3, except that this raw material composite was used.

COMPARATIVE EXAMPLE 4

The $LiNi_{0.5}Mn_{1.5}O_4$ used in Example 4 was used as a reference compound.
(Evaluation 2)
(1) Evaluation of Charging and Discharging Characteristics The nitrided lithium-transition metal compound oxide obtained in Examples 3 and 4 and the reference compounds obtained in Comparative Examples 3 and 4 were used to make button batteries to be evaluated. Active material layers were formed (10 mg), each having the nitrided lithium-transition metal compound oxide or the reference compound, which is an active material, polytetrafluoroethylene (PTFE), which is a binder, and Ketjen Black (KB), which is an electrically conducting material, at a ratio of (active material):(binder):(electrically conducting material)=70:5:25 (weight ratio). Next, Li was used as an opposite pole layer and a solution, in which $LiPF_6$ was dissolved at a concentration of 1 M in a nonaqueous solvent obtained by mixing ethylene carbonate (EC) and dimethyl carbonate (DEC) at a volume ratio of 1:1, was used as the nonaqueous solution, to obtain button batteries to be evaluated.

Charging and discharging of the obtained button batteries to be evaluated were conducted. The charging and discharging conditions were as follows:
Constant current charging and discharging: 0.2 mA;
Charging and discharging range: 0.5 V to 3.0 V; and
Initial operation: Discharge.

Figure 5:
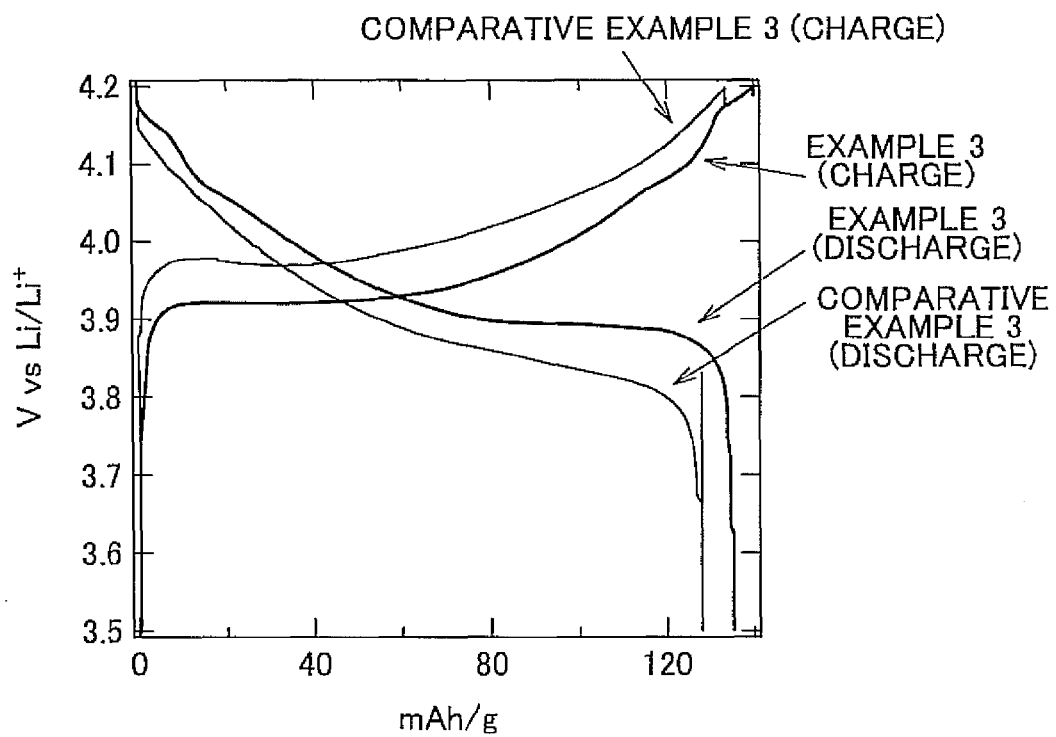
FIG. 5 shows charging and discharging curves of a button battery to be evaluated, in which a nitrided lithium-transition metal compound oxide obtained in Example 3 is used, and a button battery to be evaluated, in which a reference compound obtained in Comparative Example 3 is used.
Figure 6:
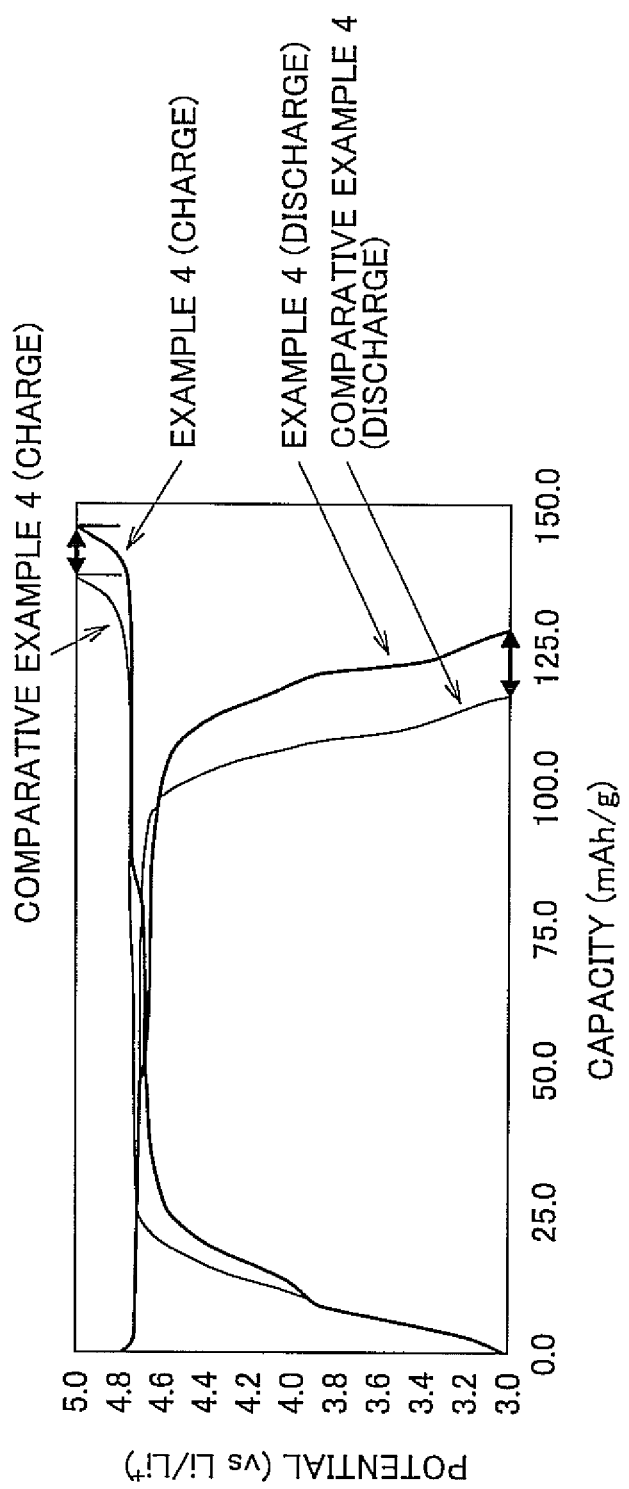
FIG. 6 shows charging and discharging curves of a button battery to be evaluated, in which a nitrided lithium-transition metal compound oxide obtained in Example 4 is used, and a button battery to be evaluated, in which a reference compound obtained in Comparative Example 4 is used.
Figure 7:
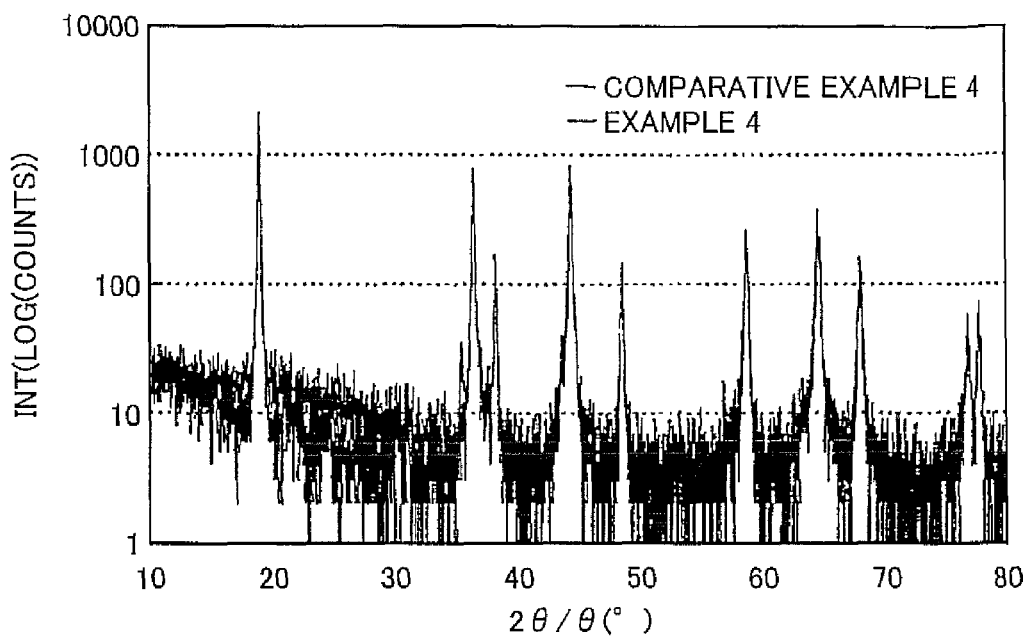
FIG. 7 shows a result of X-ray diffraction measurements of the nitrided lithium-transition metal compound oxide obtained in Example 4 and the reference compound obtained in Comparative Example 4.

The results are shown in FIGS. 5 and 6. FIG. 5 shows charging and discharging curves in the second cycle. In Example 3, both the charging capacity and the discharging capacity increased as compared to the case of Comparative Example 3. In particular, in Example 3, the voltage during charging is lower and the voltage during discharging is higher as compared to the case of Comparative Example 3. Thus, it has been confirmed that the resistance caused by the active material is reduced. In FIG. 5, the charging capacity in the case of Example 3 is 141 mAh/g, the charging capacity in the case of Comparative Example 3 is 130 mAh/g, the discharging capacity in the case of Example 3 is 138 mAh/g, and the discharging capacity in the case of Comparative Example 3 is 126 mAh/g. FIG. 6 shows charging and discharging curves in the second cycle. In Example 4, both the charging capacity and the discharging capacity increased as compared to the case of Comparative Example 3. In FIG. 6, the charging capacity in the case of Example 4 is 145.8 mAh/g, the charging capacity in the case of Comparative Example 4 is 137.2 mAh/g, the discharging capacity in the case of Example 4 is 127.7 mAh/g, and the discharging capacity in the case of Comparative Example 4 is 116.4 mAh/g. Thus, it has been confirmed that the capacity is increased by introducing nitrogen. It is considered that when part of oxygen atoms (O) are replaced by nitrogen atoms (N), an offset of positive electricity (hole h) occurs locally and the hole h compensates for the site from which the Li ion is extracted, which stabilizes the crystal structure and enable more Li ions to be extracted.
(2) X-Ray Diffraction Measurement X-ray diffraction measurements were conducted with the use of the nitrided lithium-transition metal compound oxide obtained in Example 4 and the reference compound obtained in Comparative Example 4. The result is shown in FIG. 7. As shown in FIG. 7, there is no significant difference in the peaks in XRD between Example 4 and Comparative Example 4 and it has therefore been confirmed that both the nitrided lithium-transition metal compound oxide and the reference compound have similar crystal structures.
(3) Evaluation of Appearance Visual inspection of the appearance of the nitrided lithium-transition metal compound oxide obtained in Example 4 and the reference compound obtained in Comparative Example 4 was conducted. The color of the reference compound was black and the color of the nitrided lithium-transition metal compound oxide was dark brown. Thus, it has been confirmed that by introducing nitrogen, the appearance is changed and nitriding is caused.

EXAMPLE 5-1

$LiCoO_2$ (made by Sigma-Aldrich Co.), of which the average particle size was 2.5 μm, was prepared as a raw material compound, and urea (made by Sigma-Aldrich Co.) was prepared as the nitriding agent. Next, 1 g of $LiCoO_2$ and 1 g of urea were measured ($LiCoO_2$:urea=10:8.6 in molar ratio) and mixed in a mortar to obtain a raw material composite. Then, the obtained raw material composite was formed into a mold with the dimensions, ϕ1 cm×2 mm thick, in a molding machine, and the obtained mold was put in a glass tube and the inside of the glass tube was made vacuum. Next, the glass tube was fired at 200° C. in a tubular furnace for three hours. Thus, the nitrided lithium-transition metal compound oxide was synthesized. Then, the mold was fired in the air atmosphere at 500° C. for an hour to remove the remaining urea, whereby a nitrided lithium-transition metal compound oxide was obtained.

EXAMPLES 2-2 to 2-5

Figure 8:
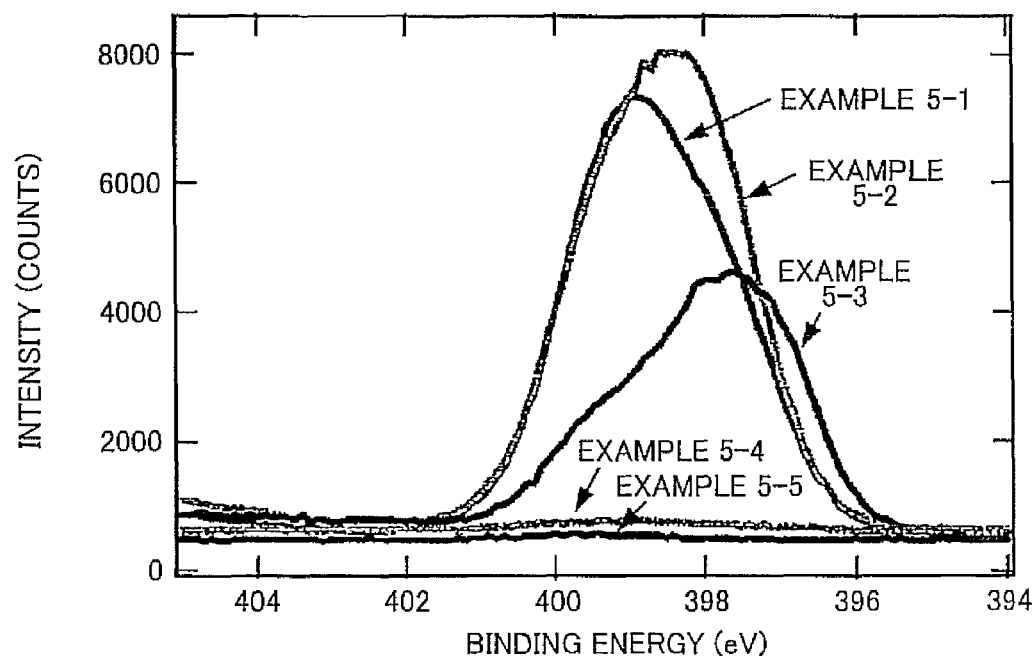
FIG. 8 shows a result of the X-ray photoelectron spectroscopy of nitrided lithium-transition metal compound oxides obtained in Examples 5-1 to 5-5.
Figure 9:
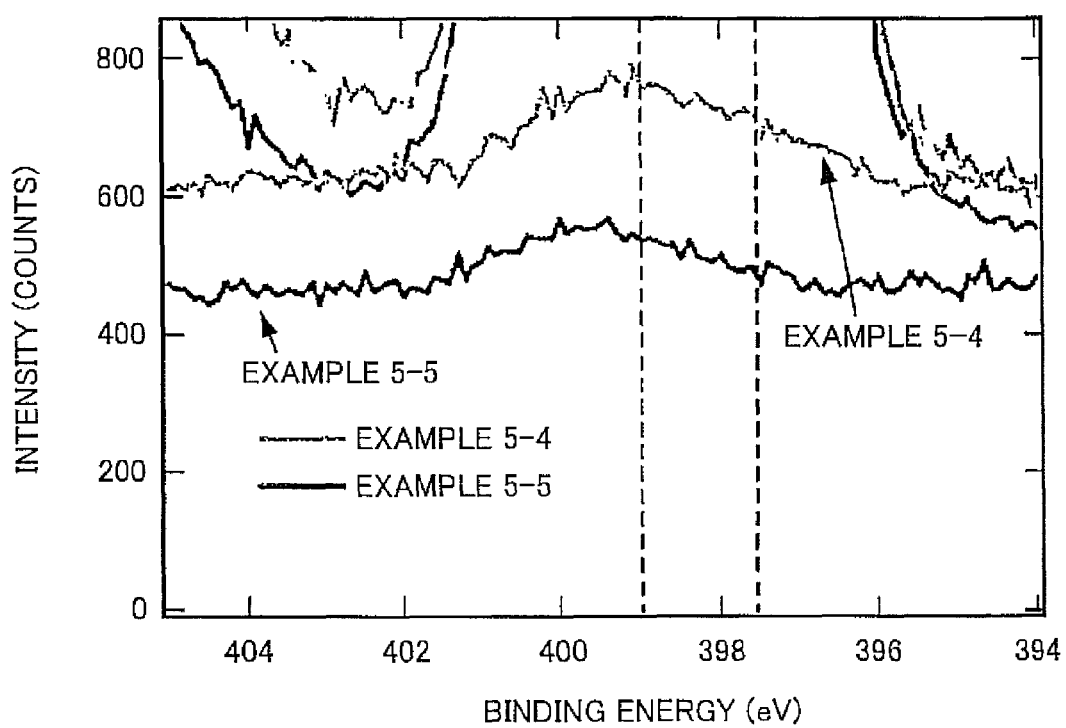
FIG. 9 is a partially enlarged view of FIG. 8.

A nitrided lithium-transition metal compound oxide was obtained in a manner similar to Example 5-1, except that the firing temperature of 200° C. was changed to 300° C., 400° C., 500° C., and 600° C., respectively.
(Evaluation 3)
X-Ray Photoelectron Spectroscopy The nitrided lithium-transition metal compound oxides obtained in Examples 5-1 to 5-5 were subjected to X-ray photoelectron spectroscopy (XPS). In the XPS, measurement was conducted for the N1s spectrum. The results are shown in FIGS. 8 and 9. FIG. 9 is a partially enlarged view of FIG. 8. The state of N in the nitrided lithium-transition metal compound oxide can be qualitatively and quantitatively evaluated by the XPS measurement for the N1s spectrum. When the result is analyzed qualitatively, the peak on the higher energy side is the peak (402 eV to 399 eV) indicating the component adsorbed on the surface and the organic component. Thus, the shift of the peak to the lower energy side indicates that O in $LiCoO_2$ is replaced by N (specifically, the peak from 399 eV to 396 eV). On the other hand, when the result is analyzed quantitatively, the higher the peak intensity is, the greater the amount of O in $LiCoO_2$ that has been replaced by N is. When FIGS. 8 and 9 are studied with this taken into consideration, the peaks are shifted to the lower energy side as the firing temperature increases in the cases of Examples 5-1 to 5-3 and it has therefore been confirmed that nitriding had progressed. Note that although it has been confirmed that nitriding had sufficiently progressed in the case of Examples 5-4 and 5-5 because peaks are seen in FIG. 9, the peak intensity is lower than those of Examples 5-1 to 5-3, which has indicated the possibility that nitrogen atoms were eliminated from the nitrided lithium-transition metal compound oxide.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations are also within the scope of the invention.

In the first aspect, the raw material is preferably a lithium-transition metal compound oxide. This is because when the raw material compound (lithium-transition metal compound oxide) is used rather than a raw material mixture, the nitrided lithium-transition metal compound oxide is easily obtained.

In the first aspect, the lithium-transition metal compound oxide is preferably a compound that has the rock-salt layer structure and is expressed by $Li_aM_bO_c$, wherein M is at least one selected from the group consisting of Mn, Co, and Ni and a to c satisfy relations, $0<a\le1.3$, $0.7\le b\le1.3$, $1.5\le c\le2.5$. This is because the nitrided lithium-transition metal compound oxide that is more excellent in electron conductivity is obtained. In addition, the lithium-transition metal compound oxide is preferably $LiCoO_2$.

In the first aspect, the lithium-transition metal compound oxide is preferably a compound that has the spinel structure and is expressed by $Li_aM_bO_c$, wherein M is at least one selected from the group consisting of Mn, Co, and Ni and a to c satisfy relations, $0<a\le2.0$, $1.5\le b\le2.5$, $3\le c\le5$. This is because the nitrided lithium-transition metal compound oxide that is more excellent in electron conductivity is obtained. In addition, the lithium-transition metal compound oxide is preferably $LiMn_2O_4$.

In the first aspect, the nitriding agent is preferably urea. This is because nitriding is effectively performed.

In the first aspect, a firing temperature in the synthesizing is preferably within a range of 100° C. to 800° C. This is because the nitrided lithium-transition metal compound oxide that is more excellent in electron conductivity is obtained.

In the first aspect, the firing temperature in the synthesizing is preferably within a range of 200° C. to 500° C. This is because the nitrided lithium-transition metal compound oxide is obtained, in which nitriding has sufficiently progressed and at the same time, the elimination of nitrogen from the nitrided lithium-transition metal compound oxide is suppressed.

In the first aspect, a firing time in the synthesizing is preferably within a range of 10 minutes to 7 hours. This is because the nitrided lithium-transition metal compound oxide that is more excellent in electron conductivity is obtained.

In the second aspect, it is preferable that nitrogen be present in the inside of the nitrided lithium-transition metal compound oxide.

In the third aspect, it is preferable that the nitrided lithium-transition metal compound oxide be a compound that has the rock-salt layer structure and is expressed by $Li_aM_bO_cN_d$, wherein M is at least one selected from the group consisting of Mn, Co, and Ni and a to d satisfy relations, $0<a\le1.3$, $0.7\le b\le1.3$, $1.5\le c\le2.5$, $0.01\le d\le0.6$. This is because with the above composition, the nitrided lithium-transition metal compound oxide that is more excellent in electron conductivity is obtained.

In the third aspect, it is preferable that the nitrided lithium-transition metal compound oxide be a compound that has the spinel structure and is expressed by $Li_aM_bO_cN_d$, wherein M is at least one selected from the group consisting of Mn, Co, and Ni and a to d satisfy relations, $0<a\le2.0$, $1.5\le b\le2.5$, $3\le c\le5$, $0.01\le d\le0.6$. This is because with the above composition, the nitrided lithium-transition metal compound oxide that is more excellent in electron conductivity is obtained.

In the third aspect, it is preferable that the nitrided lithium-transition metal compound oxide be particulate. This is because the particulate, nitrified lithium-transition metal compound oxide does not suffer the occurrence of a detachment, a crack, etc. unlike a film and is therefore excellent in durability.

In the third aspect, an average particle size of the nitrided lithium-transition metal compound oxide is preferably within a range of 100 nm to 100 μm. This is because such a nitrided lithium-transition metal compound oxide is useful as a positive electrode active material, for example.

In the third aspect, a specific surface area of the nitrided lithium-transition metal compound oxide is preferably within a range of 0.1 m²/g to 300 m²/g.

In the third aspect, it is preferable that the nitrided lithium-transition metal compound oxide be used as a positive electrode active material. This is because a high-capacity battery is obtained.

In the third aspect, it is preferable that the nitrided lithium-transition metal compound oxide be obtained by the method described above.

In the fourth aspect, the electrolyte layer is preferably a liquid electrolyte layer or a solid electrolyte layer. When the electrolyte layer is the liquid electrolyte layer, a high-power lithium-ion battery is obtained. When the electrolyte layer is the solid electrolyte layer, a lithium-ion battery that is excellent in safety is obtained.

What is claimed is:

1. A method of producing a nitrided lithium-transition metal compound oxide, the nitrided lithium-transition metal compound oxide having a rock-salt layer structure or a spinel structure comprising Li, at least one transition metal, oxygen atoms, and nitrogen atoms dispersed in the structure such that nitrogen atoms replace some of the oxygen atoms as compared to a lithium-transition metal compound oxide absent nitrogen, the method comprising the steps of:

preparing a raw material composite that has a raw material containing lithium, transition metal, and oxygen and a nitriding agent that is expressed by a following General Formula (1) and is solid or liquid at room temperature (25° C.);

(1)

wherein $R_1$, $R_2$, and $R_3$ are independent of each other and are each a functional group having at least one of carbon (C), hydrogen (H), oxygen (O), and nitrogen (N), and synthesizing the nitrided lithium-transition metal compound oxide wherein the synthesized nitride lithium-transition metal compound oxide comprises Li, at least one transition metal, oxygen atoms, and nitrogen atoms dispersed in the structure such that nitrogen atoms replace some of the oxygen atoms as compared to the lithium-transition metal compound oxide absent nitrogen by firing the raw material composite to nitride the raw material;

wherein the nitrogen is present in the synthesized nitrided lithium-transition metal compound oxide in a molar ratio of at least 0.1.

2. The method according to claim 1, wherein the raw material is a lithium-transition metal compound oxide free of nitrogen atoms in the structure of the raw material.

3. The method according to claim 2, wherein the lithium-transition metal compound oxide is a compound that has the rock-salt layer structure and is expressed by $Li_aM_bO_c$, wherein M is at least one selected from the group consisting of Mn, Co, and Ni and a to c satisfy relations, $0<a\leq1.3$, $0.7\leq b\leq1.3$, $1.5\leq c\leq2.5$.

4. The method according to claim 3, wherein the lithium-transition metal compound oxide is $LiCoO_2$.

5. The method according to claim 2, wherein the lithium-transition metal compound oxide is a compound that has the spinel structure and is expressed by $Li_aM_bO_c$, wherein M is at least one selected from the group consisting of Mn, Co, and Ni and a to c satisfy relations, $0<a\leq2.0$, $1.5\leq b\leq2.5$, $3\leq c\leq5$.

6. The method according to claim 5, wherein the lithium-transition metal compound oxide is $LiMn_2O_4$.

7. The method according to claim 1, wherein the nitriding agent is urea.

8. The method according to claim 1, wherein a firing temperature in the synthesizing is within a range of 100° C. to 800° C.

9. The method according to claim 8, wherein the firing temperature in the synthesizing is within a range of 200° C. to 500° C.

10. The method according to claim 1, wherein a firing time in the synthesizing is within a range of 10 minutes to 7 hours.

11. The method according to claim 1, wherein the firing occurs in a vacuum or reducing atmosphere adapted to prevent oxidation of the synthesized nitrided lithium-transition metal compound oxide.

12. The method according to claim 1, wherein the nitriding agent is provided in a molar ratio compared to the raw material of less than 2:1.

* * * * *

UNITED STATES PATENT AND TRADEMARK OFFICE
CERTIFICATE OF CORRECTION

PATENT NO. : 8,920,975 B2
APPLICATION NO. : 12/784796
DATED : December 30, 2014
INVENTOR(S) : Hideki Oki et al.

It is certified that error appears in the above-identified patent and that said Letters Patent is hereby corrected as shown below:

In The Specification

In Column 8, Line 20, delete "Bring" and insert --firing--, therefor.

In Column 9, Line 63, delete "Nitrified" and insert --Nitrided--, therefor.

In Column 10, Line 12, delete "$0.05 \leq d \leq 50.5$" and insert --$0.05 \leq d \leq 0.5$--, therefor.

In Column 15, Line 38, delete "01 μm" and insert --0.1 μm--, therefor.

Signed and Sealed this
Twenty-third Day of February, 2016

Michelle K. Lee
*Director of the United States Patent and Trademark Office*